United States Patent [19]

Takano et al.

[11] Patent Number: 5,668,604
[45] Date of Patent: Sep. 16, 1997

[54] HORIZONTAL MAGNIFYING CIRCUIT FOR VIDEO SIGNALS

[75] Inventors: Hiromitsu Takano; Nobuya Nakamoto, both of Tokyo, Japan

[73] Assignee: NEC Corporation, Tokyo, Japan

[21] Appl. No.: 622,210

[22] Filed: Mar. 27, 1996

[51] Int. Cl.$^6$ ........................................ H04N 5/44
[52] U.S. Cl. ........................................ 348/562; 348/582
[58] Field of Search ........................ 348/561, 562, 348/581, 582, 704; H04N 5/44, 9/74, 3/223

[56] References Cited

U.S. PATENT DOCUMENTS 5,148,277  9/1992  Kurashige .................. 348/581
5,459,525  10/1995  Izawa ........................ 348/561

FOREIGN PATENT DOCUMENTS 2-2040  3/1992  Japan .

*Primary Examiner*—Sherrie Hsia
*Attorney, Agent, or Firm*—Laff, Whitesel, Conte & Saret, Ltd.

[57] ABSTRACT

In a structure composed having a one-bit counter, a D-FF, a selector, and an AND gate, while the signal level of a thin-out signal is low, a read clock signal of a line memory is thinned out. Thus, video signals (a Y signal, a CR signal, and a CB signal) read from a line memory are horizontally magnified. At this point, both edges of a low portion of the input thin-out signal are synchronized with even number data of color difference signals (CR/CB) read from the line memory after a start signal that is a video signal read start signal is input.

3 Claims, 5 Drawing Sheets

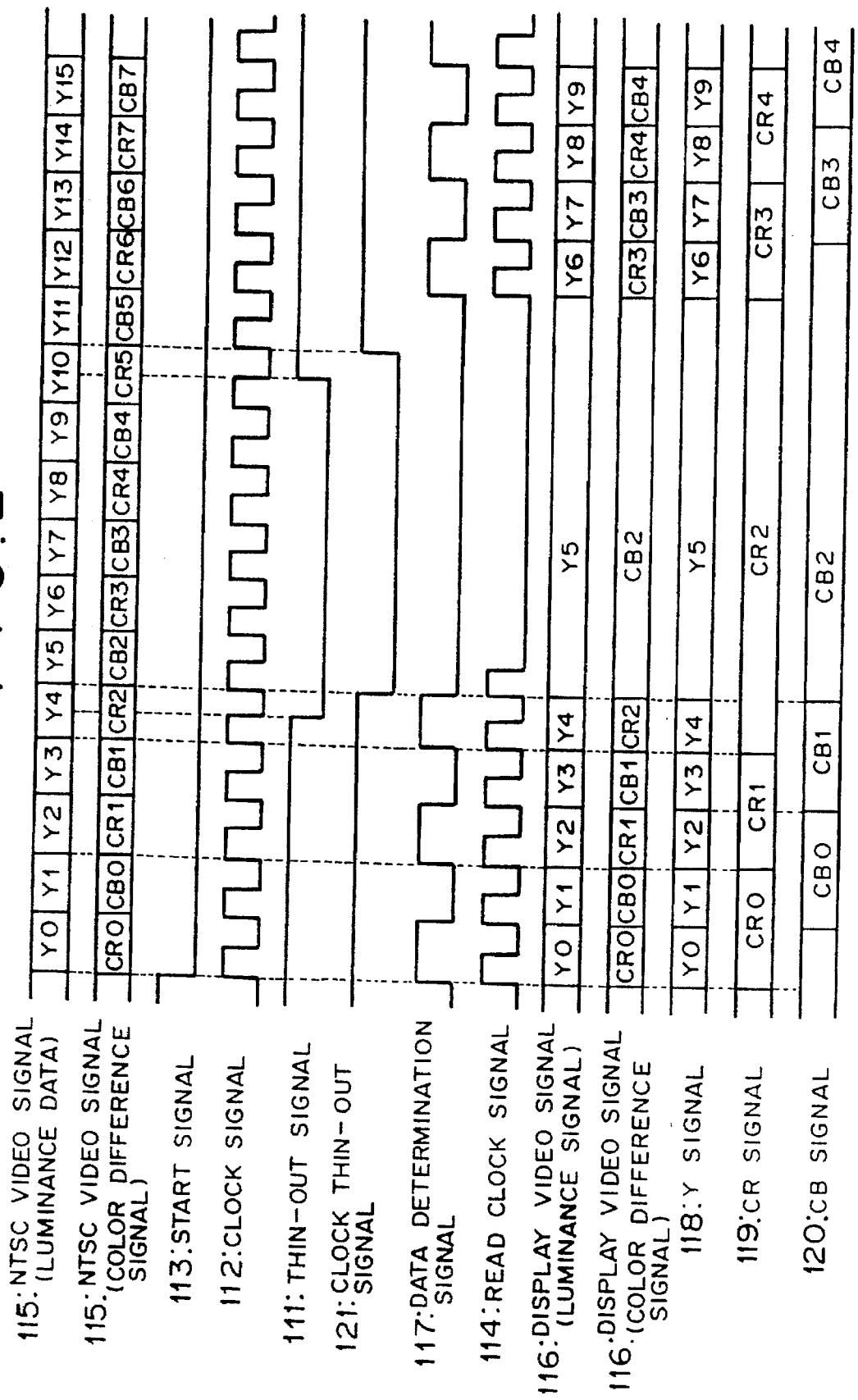

5,668,604

HORIZONTAL MAGNIFYING CIRCUIT FOR VIDEO SIGNALS

BACKGROUND OF THE INVENTION

1. Field of the Invention

The present invention relates to an NTSC digital picture magnifying circuit for outputting video signals of which the number of samples of each of color difference signals is ½ or ¼ of the number of samples of a luminance signal (hereinafter, these video signals are referred to as 4 : 2 : 1 video signal or 4: 1: 1 video signals), in particular, a horizontal magnifying circuit for video signals.

2. Description of the Related Art

FIG. 3A is a block diagram showing a structure of a digital picture magnifying circuit according to a related art reference disclosed as Japanese Patent Laid-Open Publication No. 2-2040. In FIG. 3A, a horizontal compensation memory portion 11 that composes a compensation memory 10 stores horizontal multiplication information X1 of multiplication information X through a CPU bus 4. Likewise, a vertical compensation memory portion 12 that composes the compensation memory 10 stores vertical multiplication information X2 of the multiplication information X through the CPU bus 4. The horizontal compensation memory portion 11 and the vertical compensation memory portion 12 output a horizontal compensation clock signal CX1 and a vertical compensation clock signal CX2, respectively, as a compensation clock signal C.

An address circuit 20 comprises inverters 21 and 22, a horizontal counter 23, a vertical counter 24, and selectors 25 and 26. The inverters 21 and 22 invert the horizontal clock signal C1 and the vertical clock signal C2 of the clock signal C, respectively. The horizontal counter 23 generates a read address A1 corresponding to the horizontal clock signal C1 that is output from the inverter 21. The vertical counter 24 generates a read address A2 corresponding to the vertical clock signal C2 that is output from the inverter 22. The selector 25 outputs as an address AX1 one of a horizontal storage address Ax1 of a storage address AX and a read address A1 to the horizontal compensation memory portion 11. The selector 26 outputs as an address AX2 one of a vertical storage address Ax2 and the read address A2 to the vertical compensation memory portion 12.

A counter circuit 30 comprises inverters IN1 and IN2, AND gates 31 and 32, a horizontal counter 33, a vertical counter 34, a switch S1 and S2, AND gates 35 and 36, and OR gates 37 and 38. The inverters IN1 and IN2 invert the horizontal compensation clock signal CX1 and the vertical compensation clock signal CX2, respectively. The AND gate 31 ANDs the horizontal clock signal C1 and the compensation clock signal CX1 that is output from the inverter IN1. The AND gate 32 ANDs the vertical clock signal C2 and the compensation clock signal CX2 that is output from the inverter IN2. The horizontal counter 33 generates a compensation address AC. A gate output signal D1 of the AND gate 31 is input to a one-bit LSB portion 33L of the horizontal counter 33. Likewise, the vertical counter 33 generates the compensation address AC. A gate output signal D2 of the AND gate 32 is input to a one-bit LSB portion 34L of the vertical counter 34. The switch S1 is opened or closed corresponding to the magnification information X. When the horizontal magnification information X1 represents an enlargement, the switch S1 is opened. When the horizontal magnification information X1 represents a reduction, the switch S1 is closed. Likewise, the switch S2 is opened or closed corresponding to the magnification information X.

When the horizontal magnification information X2 represents an enlargement, the switch S2 is opened. When the horizontal magnification information X2 represents a reduction, the switch S2 is closed. The AND gate 35 ANDs the horizontal clock signal C1 and the compensation clock signal CX1 that is output from the switch S1. The AND gate 36 ANDs the vertical clock signal C2 and the compensation clock signal CX2 that is output from the switch S2. The OR gate 37 ORs an output signal L1 of the LSB portion 33L of the horizontal counter 33 and a gate output signal E1 of the AND gate 35 and outputs the resultant signal to the least significant bit of an MSB portion 33M of the counter 33. The OR gate 38 ORs an output signal L2 of an LSB portion 34L of the vertical counter 34 and a gate output signal E2 of the AND gate 36 and outputs the resultant signal to the least significant bit of an MSB portion 34M of the counter 34.

Next, an operation of the above related art reference will be described.

First of all, picture data G from a CPU bus 4 is stored in the image memory 9. At this point, since a selector 40 has selected a CPU bus 4, the picture data G is stored corresponding to the storage address AG.

Thereafter, before the image memory 9 outputs picture data G', the compensation memory portions 11 and 12 of the compensation memory 10 store the horizontal magnification information X1 and the vertical magnification information X2 through the CPU bus 4, respectively. At this point, since the selectors 25 and 26 have selected the CPU bus 4, the magnification information X1 and X2 are stored corresponding to the storage addresses AX1 and AX2, respectively.

When the picture data G is magnified to ⁴⁄₃ times the picture data G in both the horizontal direction and the vertical direction, a flag of the multiplication information X that represents the enlargement is set to "1". In addition, "1" is written to addresses 4n (where n=0, 1, 2, ... and so forth) and "0" is written to addresses 4n+1, 4n+2, and 4n+3 so that data corresponding to each repetitive line of the picture data G becomes "1" and data corresponding to each non-repetitive line of the picture data G becomes "0".

When the picture data G' is read from the image memory 9, the selector 40 selects the counter circuit 30. The selectors 25 and 26 select the counters 23 and 24, respectively. Thus, in synchronization with the clock signal C that is a picture data transmission timing signal, the compensation clock signal CX is read from the compensation memory 10 corresponding to the multiplication information X. Therefore, the compensation clock signals CX1 and CX2 respectively are inputted to the counter circuit 30.

Since the flag that represents the enlargement has been set to "1", the switches S1 and S2 are opened. The AND gates 35 and 36 prohibit signals from flowing. On the other hand, the compensation clock signals CX1 and CX2 inverted by the inverters IN1 and IN2 are output to the AND gates 31 and 32, respectively. Thus, when the logic level of the compensation clock signal CX is "1", the logic level the gate output signal D becomes "0". Thus, a pulse-shaped gate output signal D of which the clock signals C1 and C2 corresponding to the addresses 4n have been thinned out is obtained (see a time chart shown in FIG. 3B).

The gate output signals D1 and D2 are output to the LSB portion 33L of the horizontal counter 33 and the LSB portion 34L of the vertical counter 34, respectively. Thus, the compensation address AC (see FIG. 3B) of which an address corresponding to 3G is repeated is output.

The picture data G stored in the image memory 9 is read in such a manner that the same line is repeatedly read on every fourth occasion. Thus, the picture data G' is magnified 4/3 times to the picture data G.

In the above-described conventional horizontal magnifying circuit for 4:2:2 or 4:1:1 video signals, when clock signals are thinned out corresponding to the flag representing the enlargement, since odd number data and even number data of color difference signals share the bus, it is not assured whether or not a thin-out signal becomes active when odd number data or even number data of the color difference signals is input. Thus, while the odd number data of the color difference signals is being input, when the thin-out signal becomes active, the video data width of odd number data does not accord with the video data width of even number data. Consequently, colors of the resultant picture data become unnatural.

FIG. 4 shows a time chart of the related art reference as shown in FIG. 3. In FIG. 4, when an NTSC video signal (luminance data) 401 and an NTSC video signal (color difference signal) 402 are read from the image memory 9 corresponding to the thin-out signal 404, and when the thin-out signal 404 is input while odd number data of the color difference data being input after the start signal 403, the video data width of CR1 does not accord with the video data width of CB1 for the Y (luminance) signal 405, the CR signal (color difference signal) 406, and the CB signal (color difference signal) 407. Thus, the colors of the resultant picture data become unnatural.

SUMMARY OF THE INVENTION

The present invention is made from the above-described point of view. An object of the present invention is to provide a horizontal magnifying circuit for causing the thin-out signal to become active corresponding to a signal received from a one-bit counter while even number data of a color difference signal is being input after a start signal and generating a memory read clock signal so that the video data width of odd number data of the color difference signal accords with the video data width of even number data thereof.

A first aspect of the present invention is a horizontal magnifying circuit for NTSC digital video signals, having a line memory for storing color difference signals of the video signals and a luminance signal thereof so that the color difference signals correlate with the luminance signal correlate, a means for reading the color difference signals from the line memory corresponding to a read clock signal so that the number of samples of the color difference signals is ½ or ¼ the number of samples of the luminance signal, and a means for thinning out the read clock signal stored in the line memory while a thin-out signal that is input at predetermined intervals is active so as to horizontally magnify the video signals read from the line memory, the horizontal magnifying circuit, comprising an adjusting circuit for synchronizing both edges of the active portion of the thin-out signal with even number data of the color difference signals read from the line memory after a start signal that is a read start signal for the video signals stored in the line memory is input.

A second aspect of the present invention is the horizontal magnifying circuit of the first aspect, wherein said adjusting circuit includes a one-bit counter for counting up an inactive portion of the thin-out signal as a logic value "1" corresponding to a basic clock signal after the start signal is inputted and outputting it as a data determination signal when the start signal is input, a selector for outputting the thin-out signal as a clock thin-out signal when the logic value of the data determination signal is "0" and for outputting a delay signal delayed for a predetermined time period corresponding to the basic clock signal as the clock thin-out signal when the logic value of the data determination signal is "1", and an AND gate for ANDing a logic value of the clock thin-out signal when the logic value of the inactive portion of the thin-out signal being "1", and a logic value of the basic clock signal and for outputting the resultant value as the read clock.

The adjusting circuit causes odd number data of the color difference signal read from the line memory to synchronize with both edges of the active portion after the start signal is input. In reality, the adjusting circuit is composed of for example a one-bit counter, a selector, an AND gate, and a delay circuit.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a time chart of the horizontal magnifying circuit according to the embodiment;

DESCRIPTION OF THE PREFERRED EMBODIMENT

Figure 1:
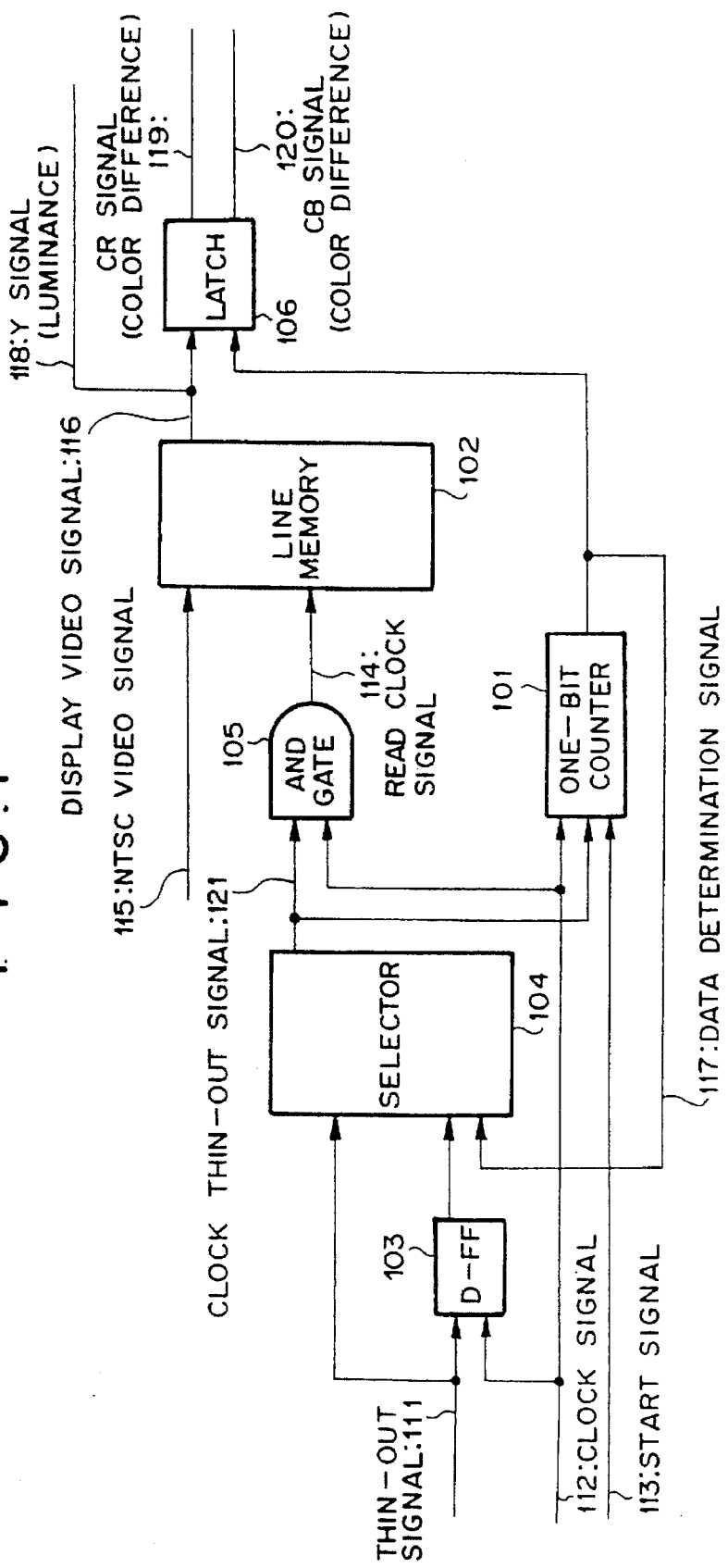
FIG. 1 is a block diagram showing a structure of a horizontal magnifying circuit for video signals according to an embodiment of the present invention.

FIG. 1 is a block diagram showing a structure of a horizontal magnifying circuit for video signals according to an embodiment of the present invention. FIG. 2 is a time chart of the horizontal magnifying circuit according to the embodiment of the present invention.

Figure 3A:
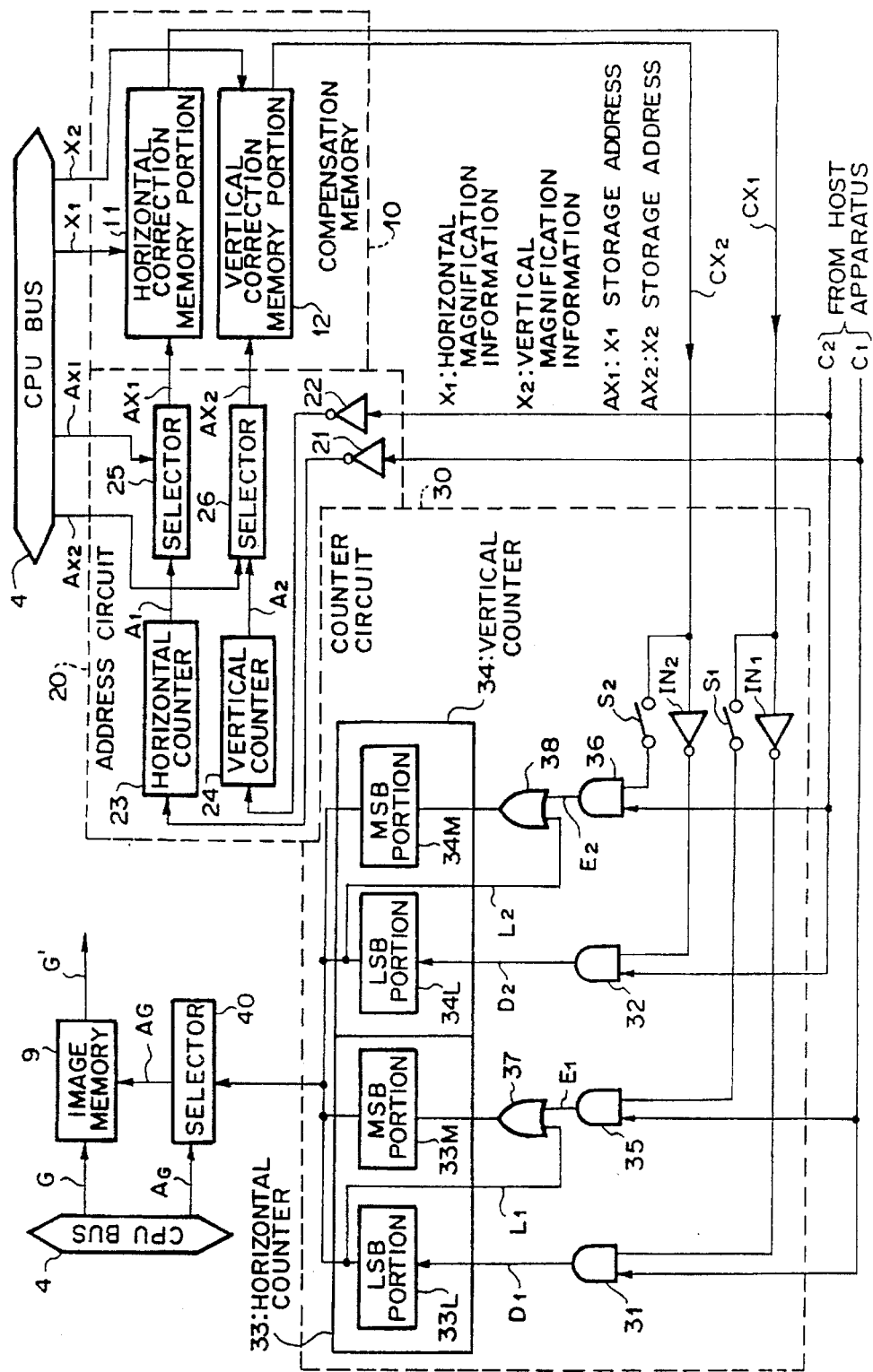
FIG. 3a is a block diagram showing a structure of a conventional digital picture magnifying circuit.
Figure 3B:
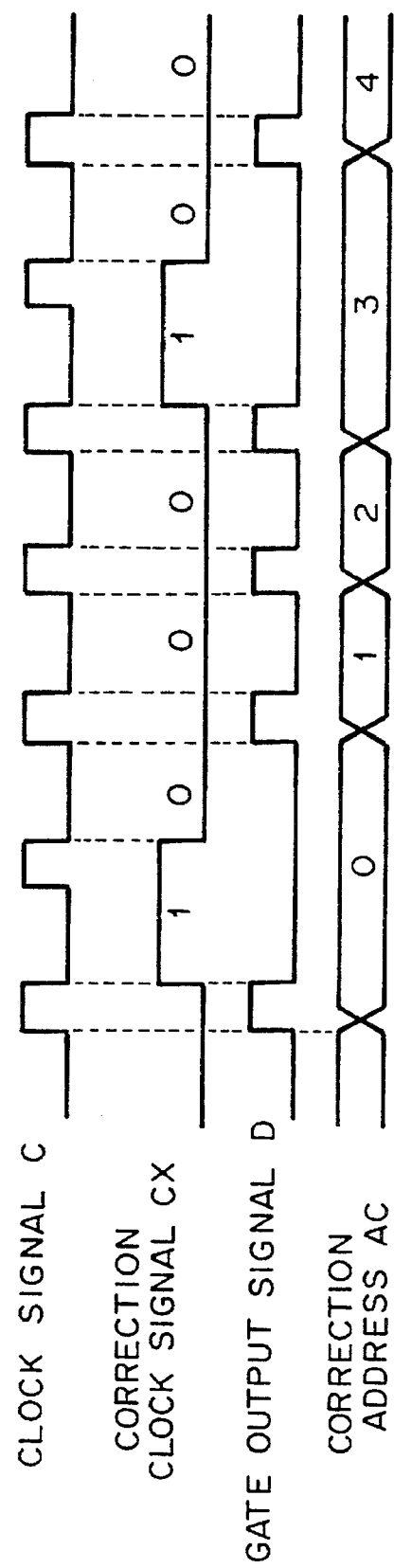
FIG. 3b is a timing chart of the conventional digital picture magnifying circuit.
Figure 4:
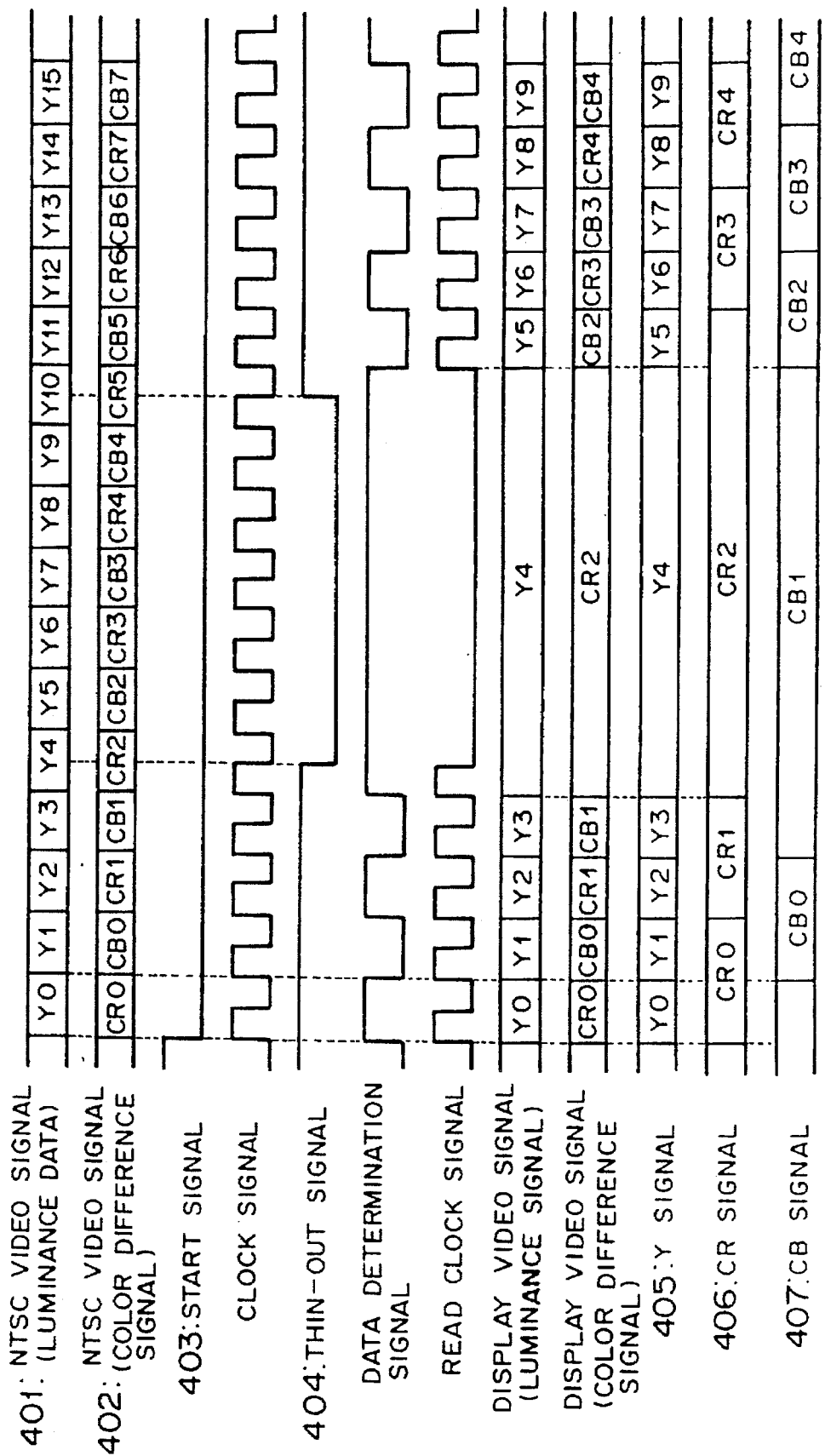
FIG. 4 is a time chart of the conventional digital picture magnifying circuit.

In the horizontal magnifying circuit shown in FIG. 1, a counter circuit 30 and an image memory 9 of the digital picture magnifying circuit shown in FIG. 3 are substituted as follows. A one-bit counter 101 inputs a clock thin-out signal 121, a clock signal 112, and a start signal 113 and outputs a data determination signal 117 for determining whether odd number data or even number data of color difference data is being input.

While even number data of the color difference signal is being input, a selector 104 selects a thin-out signal 111 corresponding to the data determination signal 117. While odd number data of the color difference data is being input, the selector 104 selects data of which the thin-out signal 111 has been delayed for ½ clock period by a D-FF 103. And the selector 104 outputs it as the clock thin-out signal 121.

An AND gate 105 inputs the clock thin-out signal 121, which has been adjusted by the data determination signal 117, and the clock signal 112 and generates a read clock signal 114.

The line memory 102, which corresponds to the image memory 9 shown in FIG. 3, stores an NTSC video signal 115 and outputs a display video signal 116 corresponding to the read clock signal 114.

A latch 106 inputs color difference data of the display video signal 116 and the data determination signal 117 and outputs a CR signal 119 and a CB signal 120.

Referring to FIGS. 1 and 2, when the one-bit counter 101 receives the start signal 113, the one-bit counter 101 counts up the clock thin-out signal 121 corresponding to the clock signal 112 and outputs as a counter output signal the data determination signal 117. While an even number pulse (logic level=0) of the data determination signal 117 is being input, the selector 104 reads the thin-out signal as it is and outputs the signal as the clock thin-out signal 121. While an odd number pulse (logic level =1) of the data determination signal 117 is being input, the selector 104 outputs as the thin-out signal 111 the data of which the thin-out signal 111 has been delayed for one clock period by the D-FF 103 as shown in FIG. 2.

An AND gate 105 ANDs the clock thin-out signal 121 and the clock signal 112 and outputs a read clock signal 114. The line memory 102 outputs as the display video signal 116 the NTSC video signal 115 corresponding to the read clock signal 114.

The luminance data of the display video signal 116 is output as a Y signal 118. The CR signal of the color latched and output as the CR signal 119 when the data determination signal 117 becomes active. The CB signal of the color difference data is latched and output as the CB signal 120 when the data determination signal 117 becomes inactive.

As shown in FIG. 2, when the thin-out signal 111 becomes low (namely, odd number data of the color difference data is input), the video data width of the CR signal 119 can be matched with the video data width of the CB signal 120. Thus, even if a video signal is horizontally magnified, the resultant picture data can be output in natural colors.

It should be noted that the present invention can be applied to a structure having dual-port memories with a random access port and a serial access port for horizontally magnifying video signals when signals are read from the serial port.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

According to the present invention, in the case that NTSC 4 : 2 : 2 or 4 : 1 : 1 video signals are horizontally magnified, when the thin-out signal becomes active while odd number data of the color difference data is being input, the thin-out signal is delayed for a ½ clock period. Thus, the data width of odd number data of the color difference signals can be matched with the data width of even number data thereof. Consequently, the magnified picture data can be output in natural colors. Therefore, a display represents accurate color images.

What is claimed is:

1. A horizontal magnifying circuit for NTSC digital video signals, comprising:

a line memory for storing color difference signals of the video signals and a luminance signal thereof so that the color difference signals correlate with the luminance signal, means for reading the color difference signals from the line memory corresponding to a read clock signal so that the number of samples of the color difference signals is ½ or ¼ the number of samples of the luminance signal, and means for thinning out the read clock signal stored in the line memory while a thin-out signal that is input at predetermined intervals is active so as to horizontally magnify the video signals read from the line memory, the horizontal magnifying circuit comprising:

an adjusting circuit for synchronizing both edges of the active portion of the thin-out signal with even number data of the color difference signals read from the line memory after a start signal that is a read start signal for the video signals stored in the line memory is input.

2. The horizontal magnifying circuit as set forth in claim 1, wherein said adjusting circuit includes:

a one-bit counter for counting up an inactive portion of the thin-out signal as a logic value "1" corresponding to a basic clock signal after the start signal is inputted and outputting a data determination signal when the start signal is input, a selector for outputting the thin-out signal as a clock thin-out signal when the logic value of the data determination signal is "0" and for outputting a delay signal delayed for a predetermined time period corresponding to the basic clock signal as the clock thin-out signal when the logic value of the data determination signal is "1", and an AND gate for ANDing a logic value of the clock thin-out signal when the logic value of the inactive portion of the thin-out signal being "1" and a logic value of the basic clock signal and for outputting a resultant value as the read clock signal.

3. The horizontal magnifying circuit as set forth in claim 1, wherein said adjusting circuit includes:

data determination signal generating means for causing the logic value of an invalid portion of the thin-out signal to become "1" corresponding to a basic clock signal and outputting a data determination signal having the half period of the basic clock signal when the start signal is input, and AND means for outputting the thin-out signal as a clock thin-out signal when the logic value of the data determination signal is "0", for delaying the thin-out signal for a predetermined time period corresponding to the basic clock signal as the clock thin-out signal when the logic value of the data determination signal is "1", for ANDing the logic value of the clock thin-out signal and the logic value of the basic clock signal, and for outputting a resultant signal as the read clock signal.

* * * * *